(12) United States Patent
Springer

(10) Patent No.: US 8,302,917 B2
(45) Date of Patent: Nov. 6, 2012

(54) BRACKET

(75) Inventor: Kristopher Paul Springer, Spririt Lake, ID (US)

(73) Assignee: Soundbar Brackets LLC, Millwood, WA (US)

( * ) Notice: Subject to any disclaimer, the term of this patent is extended or adjusted under 35 U.S.C. 154(b) by 300 days.

(21) Appl. No.: 12/833,205

(22) Filed: Jul. 9, 2010

(65) Prior Publication Data
US 2012/0008795 A1    Jan. 12, 2012

(51) Int. Cl.
*A47F 5/00* (2006.01)
*H04R 1/02* (2006.01)

(52) U.S. Cl. ........................................ 248/122.1; 381/87

(58) Field of Classification Search ............... 381/87, 381/333, 338; 248/441.1, 917, 918, 122.1
See application file for complete search history.

(56) References Cited

U.S. PATENT DOCUMENTS

| 5,915,657 A | * | 6/1999 | Ptak | 248/286.1 |
| 8,083,189 B2 | * | 12/2011 | Sun et al. | 248/122.1 |
| 2005/0263659 A1 | * | 12/2005 | Pfister et al. | 248/289.11 |

* cited by examiner

*Primary Examiner* — Xu Mei
*Assistant Examiner* — David Ton
(74) *Attorney, Agent, or Firm* — Timberline Patent Law Group PLLC; Christopher Lattin

(57) ABSTRACT

The present disclosure relates to a bracket, particularly to a universal style bracket for mounting a speaker to a television or monitor panel.

17 Claims, 5 Drawing Sheets

BRACKET

BACKGROUND

Users of video panels, such as televisions, computer monitors, and other viewing screens often desire to combine the video panel with another device, such as a speaker, soundbar speaker system (hereinafter simply "soundbar"), video camera, microphone, and so forth. Disclosed herein is a bracket, which used alone, in pairs, or in multiple combinations may be used to connect any of a variety of video panels to any of a variety of other devices, such as soundbars, speakers, and so forth.

Figure 1:
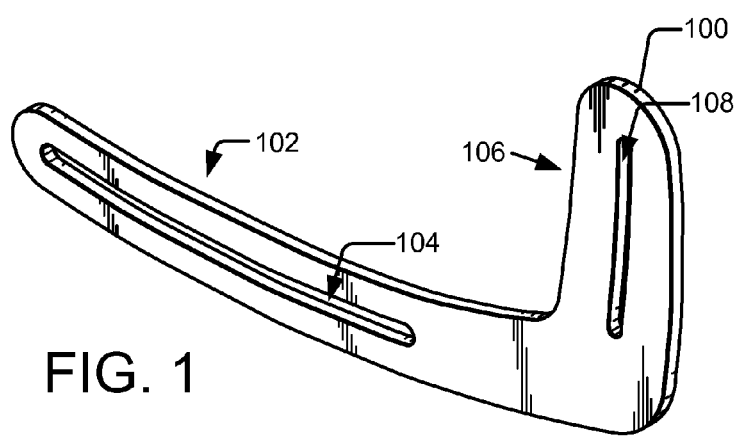
FIG. 1 is a perspective view of a bracket according to one implementation disclosed herein.
Figure 2:
FIG. 2 is a top plan view of the bracket shown in FIG. 1.
Figure 3:
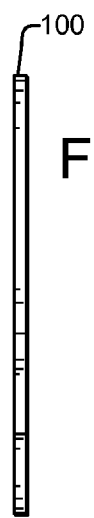
FIG. 3 is a left side elevational of the bracket shown in FIG. 1.

Certain terminology will be used in the following description for the sake of convenience and reference only, and are not intended to be limiting. For example, the words "vertical", "horizontal", "up", "down," "over," "under," "above," "below," and so forth will refer to directions within the drawing to which reference is made. Said terminology will include the words specifically mentioned, derivatives thereof, and words of similar import. Moreover, the orientations shown are merely for purposes of demonstration; alternative orientations not shown are intended to be included within the scope of the recited claims.

In the following detailed description, reference is made to the accompanying schematic drawings, which form a part hereof. The use of the same symbols in different drawings typically indicates similar or identical items. The illustrative embodiments described in the detailed description, drawings, and claims are provided merely for illustration and are not meant to be limiting. Other embodiments may be utilized, and other changes may be made, without departing from the spirit or scope of the subject matter presented here.

DETAILED DESCRIPTION

The present disclosure provides a mounting bracket, particularly for use in mounting a device to a video panel. According to one implementation, a mounting bracket is secured to a device, such as a speaker or soundbar, and to a video panel, such as a television or computer monitor. For sound bar applications, two brackets may be used to mount the soundbar to the video panel, or vice versa, using two engagement mechanisms, such as mounting points, on the soundbar and two engagement mechanisms on the video panel. Thus, the speaker or soundbar and video panel are connected and may be, for example, hung together on a wall using a mounting bracket or affixed to a video panel stand. The bracket may be considered universal in that it may be used for a variety of different applications.

As shown in FIGS. 1-6, a bracket 100 for securing to a device and to a video panel may include a first portion 102 having a first elongated aperture 104, the first elongated aperture extending along the first portion 102 and configured to engage with an engagement mechanism on the device or the video panel. The bracket 100 additionally includes a second portion 106 that extends from, and is contiguous with, the first portion 102, the second portion 106 having a second elongated aperture 108 configured to engage with an engagement mechanism on the device or the video panel. The terms "first portion" and "second portion" are used in general sense to provide understanding of the bracket. The exact point at which the first portion terminates and the second portion begins is not necessarily critical except to understand that the bracket consists of primarily the first and second portions and additional portions may not be required.

Figure 4:
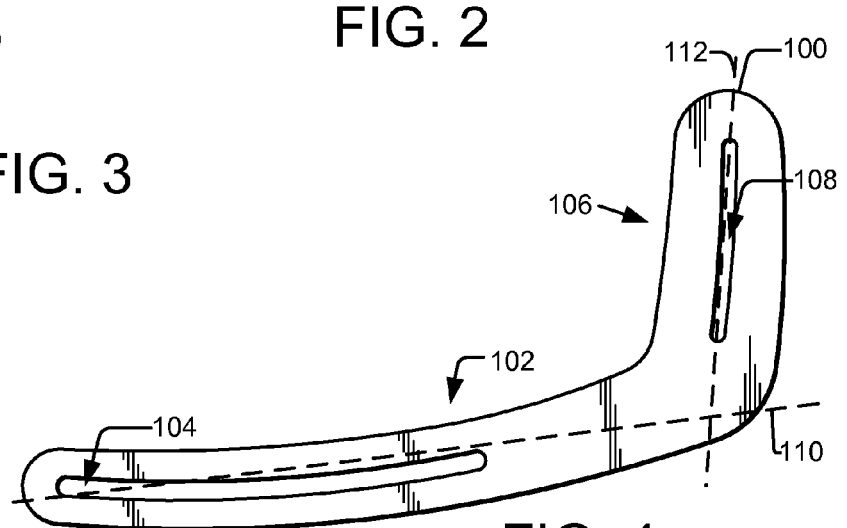
FIG. 4 is a front view of the bracket shown in FIG. 1, the rear view being a mirror image of the front view.
Figure 5:
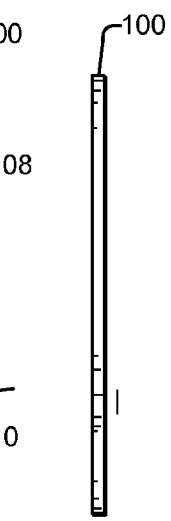
FIG. 5 is a right side elevational view of the bracket shown in FIG. 1.
Figure 6:
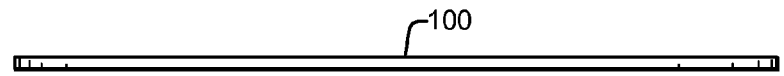
FIG. 6 is a bottom plan view of the bracket shown in FIG. 1.

As mentioned above, the first portion 102 of bracket 100 has a first aperture 104. The first aperture 104 of bracket 100 may extend arcuately or nonlinearly along a longitudinal direction, i.e. along a longitudinal axis 110, of the first portion 102 to slidably engage with an engagement mechanism, such as a mounting bolt, associated with the device or the video panel as will be shown with further reference to FIGS. 7-14. Arcuate, as used herein, may refer to any bent, bowed, arched, arced, curved, skewed, or irregular shape that deviates from a straight line. The longitudinal axes 110 and 112 shown in FIG. 4 are schematic and are provided for reference to show the general configuration of the first and second portions 102 and 106 and the first and second apertures 104 and 108 by showing an axis or line along the lengthwise direction of the portions. The actual longitudinal axis may vary from that shown in these figures, which are schematic and, thus, not necessarily exact or to scale.

The first portion 102 may also have arcuate periphery shape and the shape may generally correspond to the shape of the first aperture 104. However, as one skilled in the art will appreciate, the first portion may be configured in any desired shape to accommodate any mounting bracket configuration or design consideration.

As mentioned above, the second portion 106 of bracket 100 has a second aperture 108. The second aperture 108 extends generally along a longitudinal axis 112, i.e. along a longitudinal direction, of the second portion 106 to slidably engage with an engagement mechanism, such as a mounting bolt, associated with the device or the video panel. The second aperture 108 may be arcuate or may be generally straight. The second portion 106 may also have an arcuate periphery shape and the shape may generally correspond to the shape of the second aperture 108. However, as one skilled in the art will appreciate, the first portion may be configured in any desired shape to accommodate any mounting bracket configuration or design consideration.

The longitudinal axis 112 of the second portion 106 extends from the longitudinal axis 110 of the first portion 102 at approximately between a 95 and 175 degree angle depending upon the application. According to one implementation, the longitudinal axis 112 of the second portion 106 extends from the longitudinal axis 110 of the first portion 102 at approximately between a 95 and 115 degree angle depending upon the application.

The bracket 100 as shown in FIGS. 1-6 is configured such that the first portion is planar with the second portion. However, according to an alternate implementation, the first and second portions may be offset such that they are not in the same plane. For example, the first and second portions 102 and 106 maybe be on different, but parallel, planes or may be on intersecting planes, either of which may be accomplished by bending a portion of the first and/or second portions 102 and 106. According to another alternate implementation, the first and/or second portions 102 and 106 themselves may not be planer, i.e., each or either may be bent, bowed, arched, arced, curved, skewed, or irregular shape that deviates from a flat plane depending on the application and design need.

According to one implementation, as shown in FIGS. 1-6 the first portion 102 of the bracket 100 is longer than the second portion 106. According to an alternate implementation, the second portion 106 may be the same length, or longer than, the first portion 102.

The bracket 100 may be configured of metal, wood, plastic, or other suitable material. According to one implementation, the bracket may be steel, though the bracket may alternatively be constructed of aluminum or other metallic material. The bracket may have any suitable thickness and the thickness may depend on application or design choice.

FIGS. 7-14 show various configurations in which the bracket 100 may be used. These configurations are exemplary are not intended to limit use of the bracket 100. Moreover, for the sake of simplicity, details of the video panel and device are not shown. As used herein, the terms "engagement mechanisms" and "mounting points" are used interchangeably and may refer to bolts, screws, clips, claws, or other suitable mounting device as is well known in the art to secure the device or video panel to a wall, bracket, or other device. For example, the device or video panel may have a threaded bolt extending therefrom which is secured to the bracket using a nut. Additionally or alternatively, a threaded bolt may be extended through the appropriate aperture in the bracket 100 and secured to a threaded port in the device or video panel as is well understood in the art. Although the devices and video panels are shown in a given configuration, such as the video panel being placed above the device, this is exemplary only, and it is to be understood that the device could be placed above, beside, or in other proximity to the video panel if appropriate mounting points are available to permit such a configuration.

Figure 7:
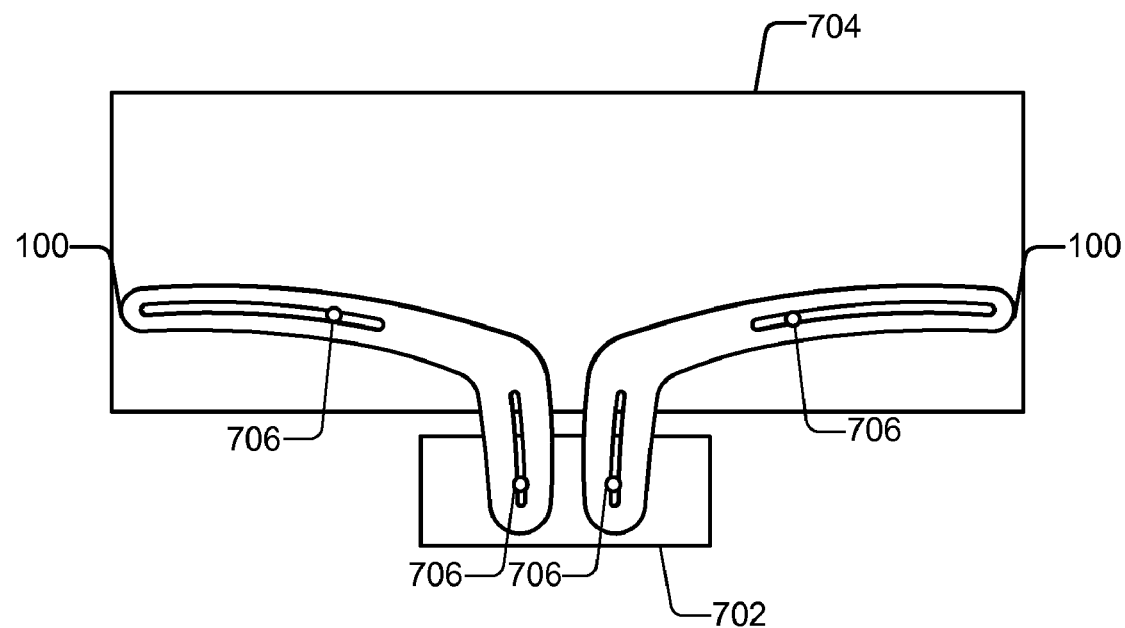
FIGS. 7-12 are side elevational views showing two brackets configured in alternative arrangements to secure to a device and a video panel.

FIG. 7 shows the bracket 100 secured to the back side of a speaker 702 and to the back side of a video panel 704 thereby mounting the speaker 702 to the video panel 704 or vice versa. Mounting points 706 secure the bracket 100 to the speaker 702 and video panel 704. The location of the mounting points 706 may vary from those shown herein in FIGS. 14-15. One advantage of the bracket 100 disclosed herein is its ability to adjust to a variety of mounting points on a variety of different sized devices and video panels.

As will be appreciated by one skilled in the art, the brackets 100 may be adjusted to move the speaker 702 and video panel 704 relative to one another. For example, the speaker 702 may be arranged askew of the video panel 704 or the speaker 702 may be moved closer to, or further from, the video panel 704. Moreover, the speaker 702 may be arranged to be offset from the vertical centerline of the video panel 704 as desired or required for a given application.

Figure 8:
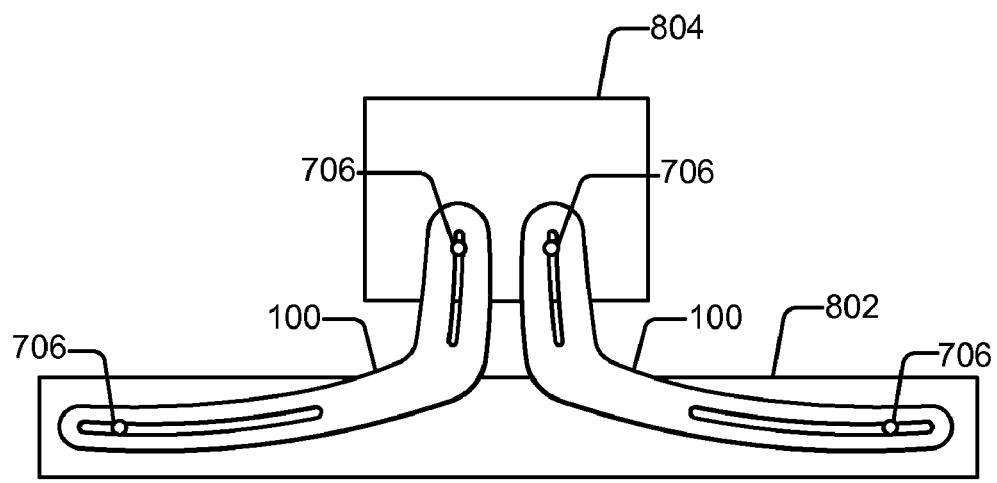

FIG. 8 shows an alternative configuration in which the bracket 100 is secured to the back side of a soundbar 802 (or, alternatively, a speaker) and to the back side of a video panel 804 via mounting points 706. As will be appreciated by one skilled in the art, the brackets 100 may be adjusted to move the soundbar 802 and video panel 804 relative to one another. For example, the soundbar 802 may be arranged askew of the video panel 804 or the speaker may be moved closer to, or further from, the video panel 804. Moreover, the soundbar 802 may be arranged to be offset from the vertical centerline of the video panel 804 as desired or required for a given application. One advantage or the bracket 100 that is highlighted by the configurations shown in FIGS. 7 and 8 is that the bracket 100 allows the mounting of a soundbar 802 or speaker that is larger or smaller than the video panel 804.

Figure 9:
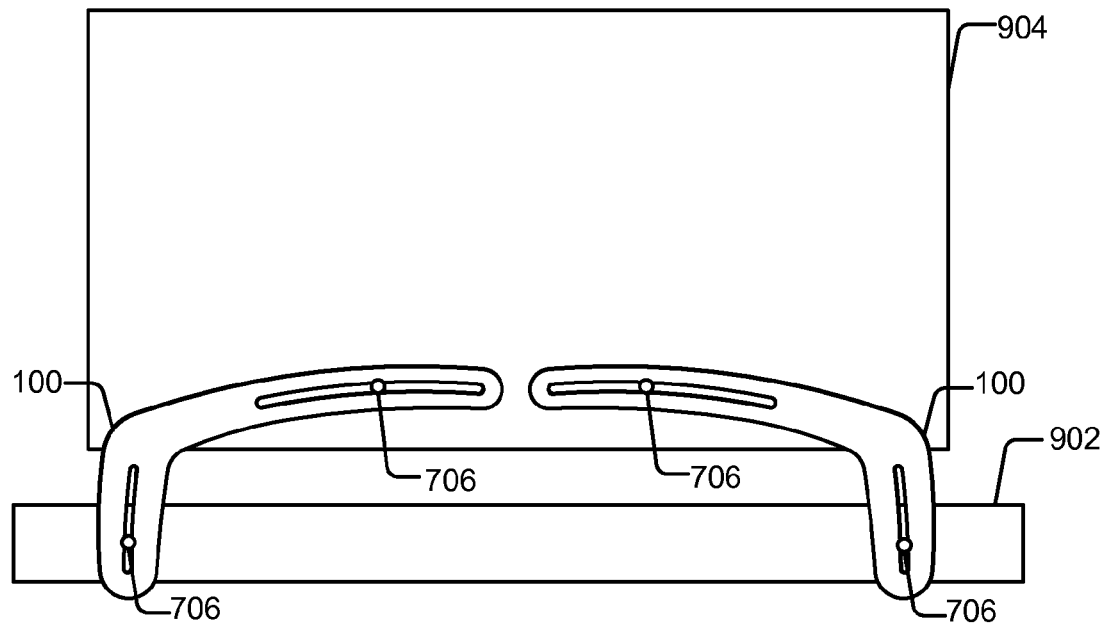

FIG. 9 shows an alternative configuration in which the bracket 100 is secured to the back side of a soundbar 902 (or, alternatively, a speaker) and to the back side of a video panel 904. As discussed above with the configurations shown in FIGS. 7-8, the brackets 100 may be adjusted to move the soundbar 902 and video panel 904 relative to one another.

Figure 10:
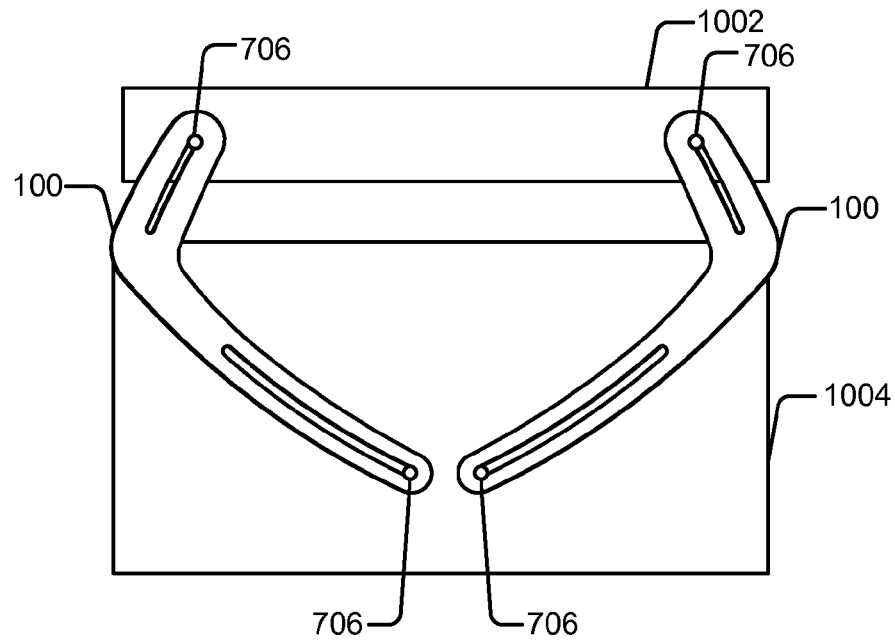

FIG. 10 shows another alternative configuration in which the bracket 100 is secured to the back side of a soundbar 1002 (or, alternatively, a speaker) and to the back side of a video panel 1004 using bracket 100 via mounting points 706. As discussed above with the configurations shown in FIGS. 7-8, the brackets 100 may be adjusted to move the soundbar 1002 and video panel 1004 relative to one another. The configuration shown in FIG. 10 highlights the advantage that the bracket 100 can be utilized to mount a soundbar 1002 or speaker above or below a video panel 1004. Moreover, using the longer first portion of bracket 100, the bracket can reach mounting points that are relatively distant from the edge of the video panel, speaker, or soundbar.

Figure 11:
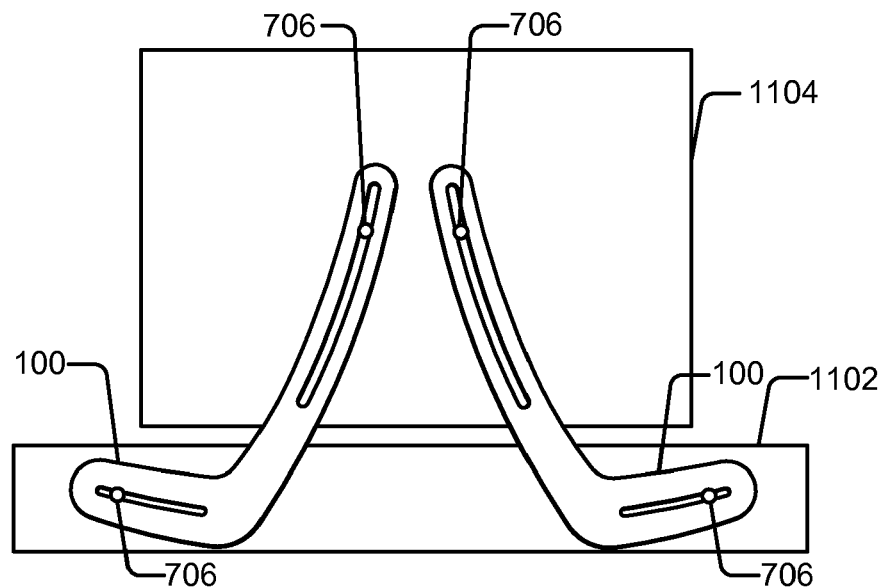

FIG. 11 shows another alternative configuration in which the bracket 100 is secured to the back side of a soundbar 1102 (or, alternatively, a speaker) and to the back side of a video panel 1104 via mounting points 706. As discussed above with the configurations shown in FIGS. 7-8, the brackets 100 may be adjusted to move the soundbar 1102 and video panel 1104 relative to one another.

Figure 12:
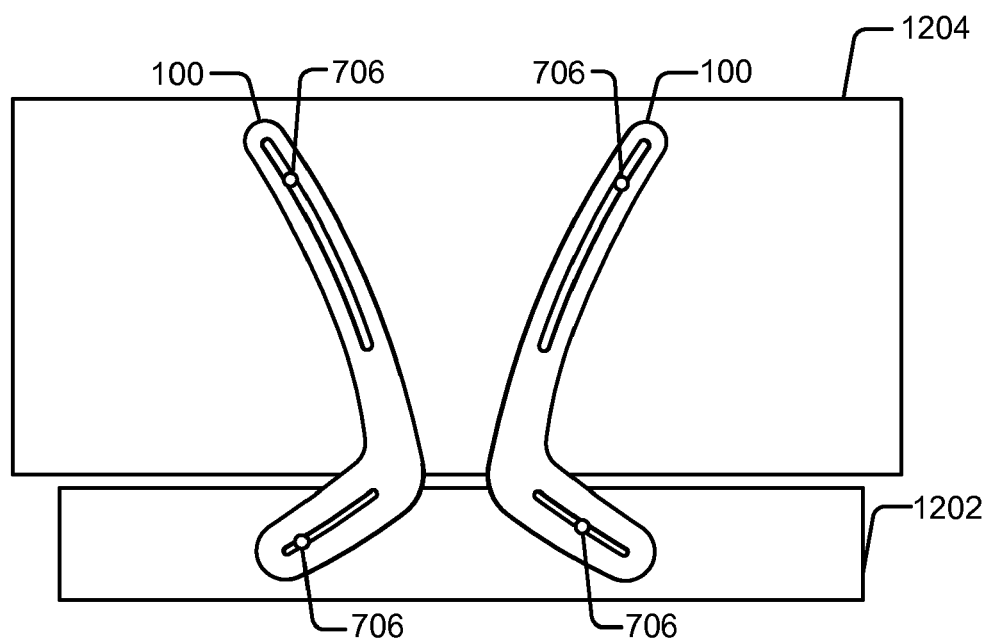

FIG. 12 shows another alternative configuration in which the bracket 100 is secured to the back side of a soundbar 1202 (or, alternatively, a speaker) and to the back side of a video panel 1204 via mounting points 706. As discussed above with the configurations shown in FIGS. 7-8, the brackets 100 may be adjusted to move the soundbar 122 and video panel 1204 relative to one another.

Figure 13:
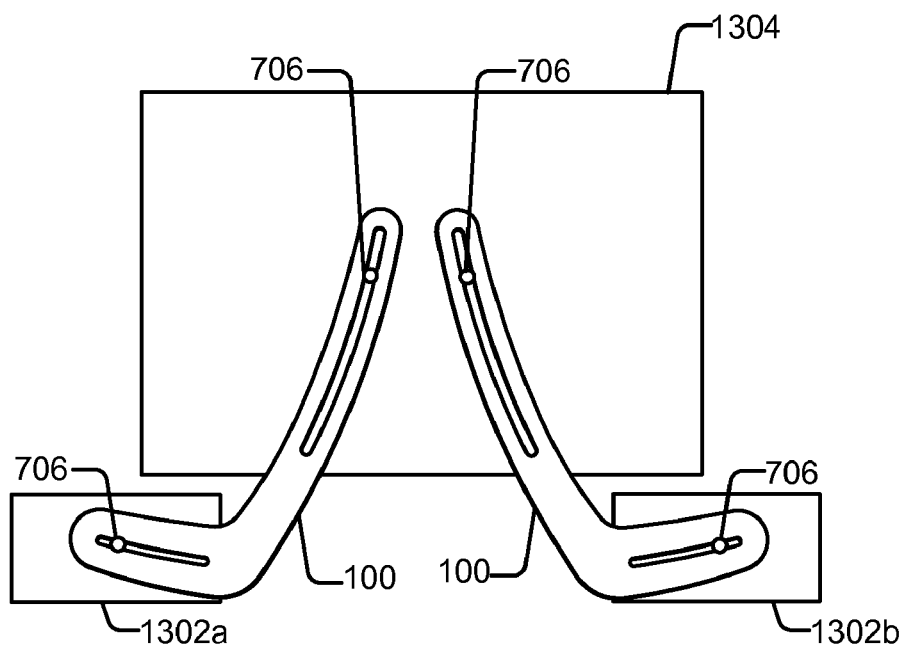
FIG. 13 is a side elevational view showing two brackets configured to secure to a device and a video panel.
Figure 14:
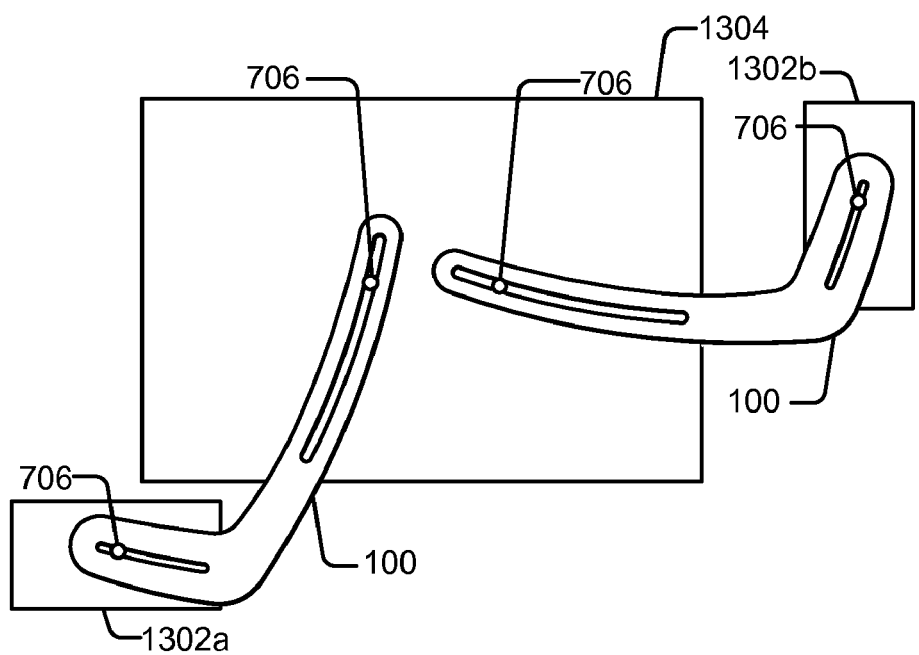
FIG. 14 is a side elevational view of an alternate configuration of the two brackets shown in FIG. 13.

FIG. 13 shows another alternative configuration in which the back sides of a first speaker 1302*a* and a second speaker 1302*b* are mounted to the bracket 100, which in turn is mounted to the back side of a video panel 1304. As discussed above with the configurations shown in FIGS. 7-8, the brackets 100 may be adjusted to move the speakers 1302*a* and 1302*b* and video panel 1304 relative to one another. FIG. 14 shows a different exemplary configuration of the first speaker 1302*a* and the second speaker 1302*b* mounted to the back side of a video panel 1304 via brackets 100. It is to be appreciated that merely one speaker 1302*a* or 1302*b* may be mounted if desired. Likewise, for soundbars or center channel speakers in which only one mounting point 706 is provided, a single bracket 100 may be utilized.

CONCLUSION

The above described system and methods provide a bracket for mounting a first structural unit, such as a speaker, to a second structural unit, such as a television panel. Although the system and method has been described in language specific to structural features and/or methodological acts, it is to be understood that the system and method defined in the appended claims is not necessarily limited to the specific features or acts described. Rather, the specific features and acts are disclosed as exemplary forms of implementing the claimed system and method.

What is claimed is:

1. A single piece bracket for mounting a device to a video panel, the bracket comprising:
   a first portion having a first elongated aperture, the first elongated aperture extending arcuately along the first portion and configured to engage with a first engagement mechanism associated with the device or the video panel; and
   a second portion that extends from, is contiguous with, and is coplanar with, the first portion within the single piece bracket, the second portion having a second elongated aperture configured to engage with a second engagement mechanism associated with the device or the video panel, the first and second portions configured to mount the device to the video panel such that the device and video panel are generally facing the same direction.

2. The bracket of claim 1, wherein the first elongated aperture extends arcuately along a longitudinal direction of the first portion to slidably engage with the first engagement mechanism associated with the device or the video panel.

3. The bracket of claim 2, wherein the first portion is arcuate, such that the shape of the first portion corresponds to the shape of the first elongated aperture.

4. The bracket of claim 1, wherein the second elongated aperture extends arcuately along a longitudinal direction of the second portion to slidably engage with the second engagement mechanism associated with the device or the video panel.

5. The bracket of claim 4, wherein the second portion is arcuate, such that the shape of the second portion corresponds to the shape of the second elongated aperture.

6. The bracket of claim 1, wherein the first portion has a first longitudinal axis and the second portion has a second longitudinal axis, the second longitudinal axis extending from the first longitudinal axis at approximately between a 95-115 degree angle.

7. The bracket of claim 6, wherein the first portion extends to a greater extent along the first longitudinal axis than the second portion extends along the second longitudinal axis.

8. The bracket of claim 6, wherein the first elongated aperture extends to a greater extent along the first longitudinal axis than the second elongated aperture extends along the second longitudinal axis.

9. The bracket of claim 1, wherein the first portion is longer than the second portion.

10. A single piece bracket for mounting a speaker or soundbar to a video panel, the bracket comprising:
    a first portion having a first longitudinal axis and a first elongated aperture, the first elongated aperture configured to engage with a first mounting point on the speaker, soundbar, or video panel; and
    a second portion that extends from, is contiguous with, and is coplanar with, the first portion within the single piece bracket, the second portion having a second longitudinal axis and a second elongated aperture configured to engage with a second mounting point on the speaker, soundbar, or video panel, the second longitudinal axis extending from the first longitudinal axis at approximately between a 95-115 degree angle, the first and second portions configured to mount the device to the video panel such that the device and video panel are generally facing the same direction.

11. The bracket of claim 10, wherein the first elongated aperture extends non-linearly along the direction of the first longitudinal axis to slidably engage with the first mounting point associated with the speaker, soundbar, or video panel.

12. The bracket of claim 10, wherein the second aperture extends nonlinearly along the direction of the second longitudinal axis to slidably engage with the second mounting point associated with the speaker, soundbar, or video panel.

13. The bracket of claim 10, wherein the first portion extends to a greater extent along the first longitudinal axis than the second portion extends along the second longitudinal axis.

14. The bracket of claim 10, wherein the first elongated aperture extends to a greater extent along the first longitudinal axis than the second elongated aperture extends along the second longitudinal axis.

15. A single piece bracket for mounting a speaker or soundbar to a video panel, the bracket comprising:
    a first portion having a first longitudinal axis and a first elongated aperture, the first elongated aperture extending arcuately along the first portion and configured to engage with a mounting point on the speaker, soundbar, or video panel; and
    a second portion that extends from, is contiguous with and is coplanar with, the first portion within the single piece bracket, the second portion having a second longitudinal axis and a second elongated aperture, the second elongated aperture extending arcuately along the second portion and configured to engage with a mounting point on the speaker, soundbar, or video panel, the second longitudinal axis extending from the first longitudinal axis at approximately between a 95-115 degree angle, the first and second portions configured to mount the speaker or soundbar to the video panel such that the video panel and speaker or soundbar are generally facing the same direction.

16. The bracket of claim 15, wherein the first portion extends to a greater extent along the first longitudinal axis than the second portion extends along the second longitudinal axis.

17. The bracket of claim 15, wherein the first elongated aperture extends to a greater extent along the first longitudinal axis than the second elongated aperture extends along the second longitudinal axis.

* * * * *